Jan. 4, 1955   R. P. GUTTERMAN   2,698,930
MAGNETIC DISPLACEMENT RECORDER
Filed March 31, 1949   4 Sheets-Sheet 1
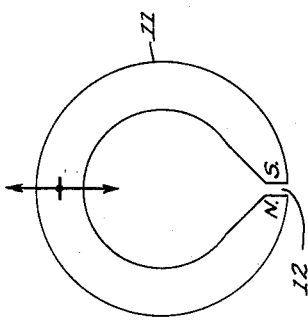
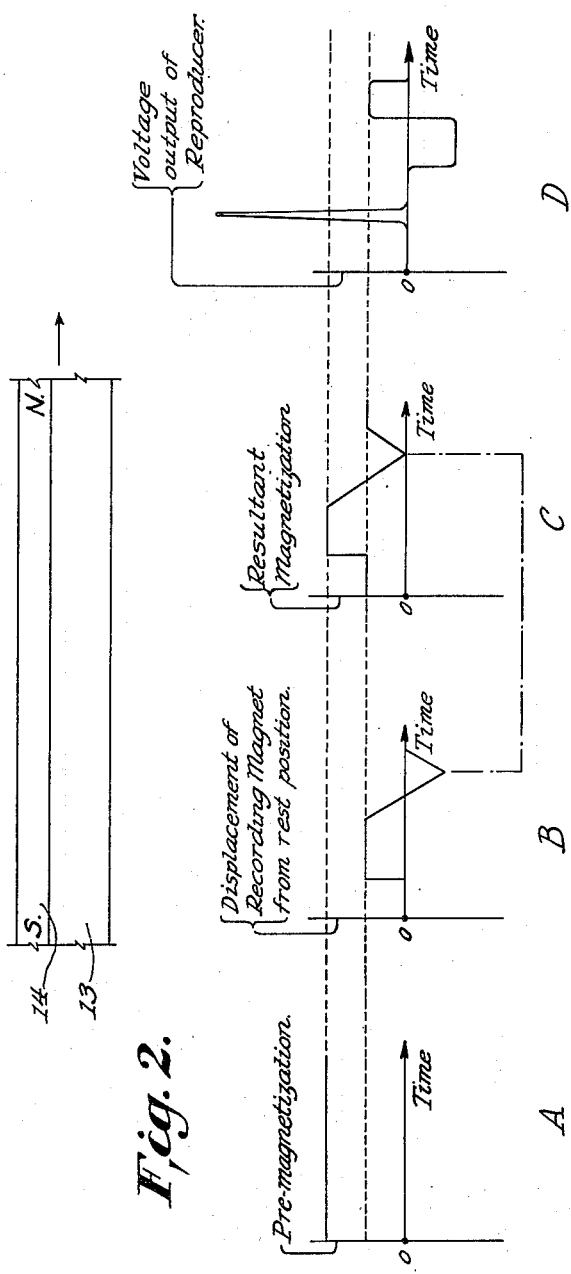
INVENTOR.
Robert P. Gutterman.
BY
Cushman, Darby & Cushman
Attorneys.

Jan. 4, 1955 R. P. GUTTERMAN 2,698,930
MAGNETIC DISPLACEMENT RECORDER
Filed March 31, 1949 4 Sheets-Sheet 2
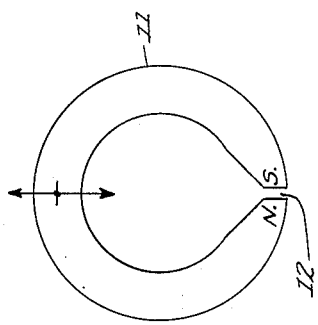
Fig. 3.
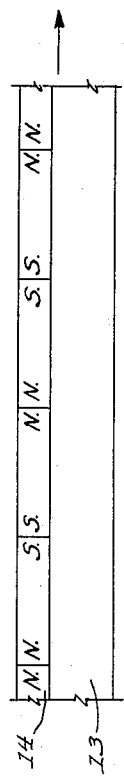
Fig. 4.
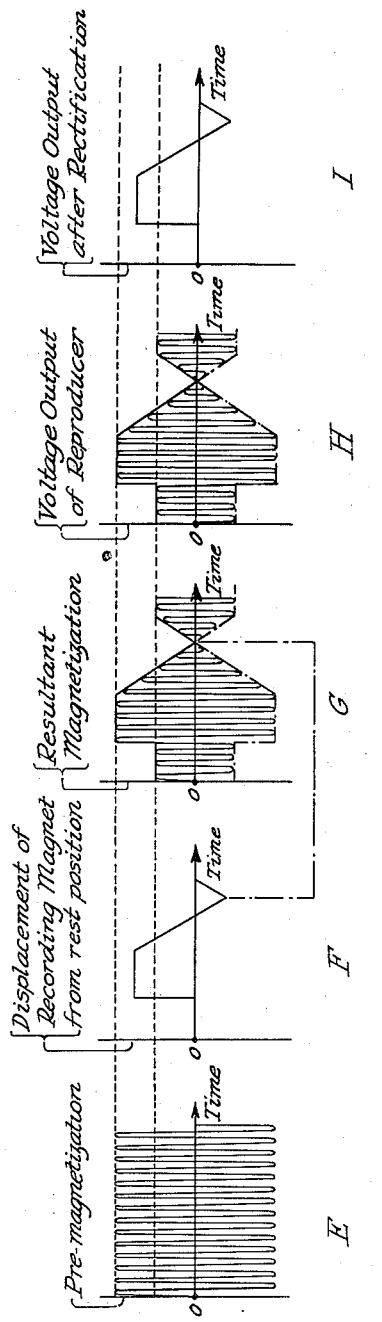
INVENTOR.
Robert P. Gutterman.
BY
Cushman, Darby & Cushman
Attorneys.

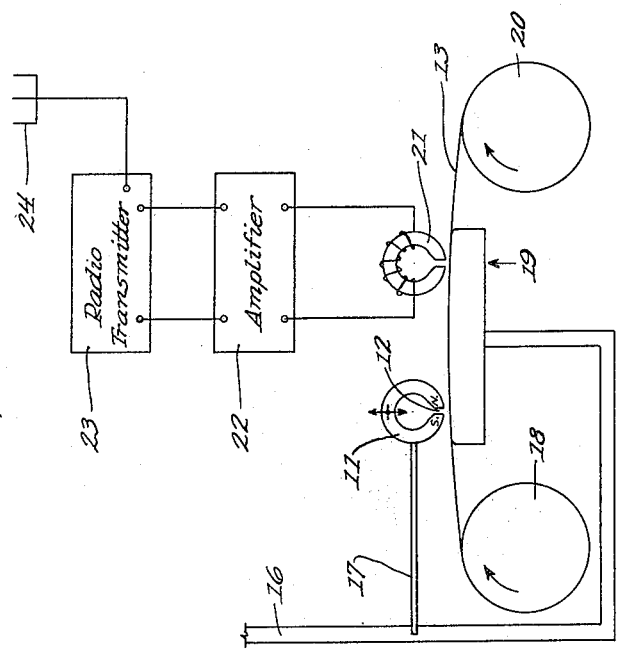
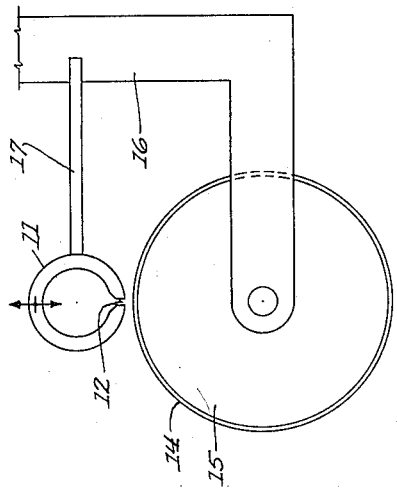

Jan. 4, 1955 R. P. GUTTERMAN 2,698,930
MAGNETIC DISPLACEMENT RECORDER
Filed March 31, 1949 4 Sheets-Sheet 4
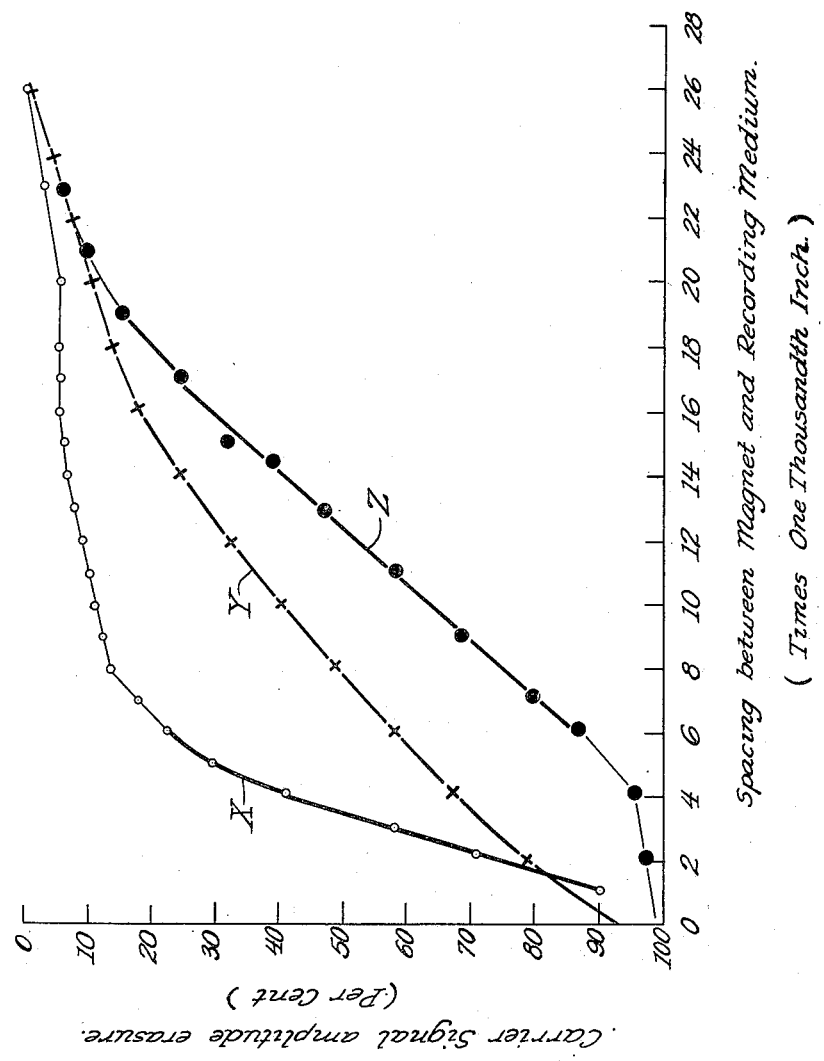
INVENTOR.
Robert P. Gutterman.
BY
Cushman, Darby & Cushman
Attorneys United States Patent Office 2,698,930
Patented Jan. 4, 1955

2,698,930

MAGNETIC DISPLACEMENT RECORDER

Robert P. Gutterman, Silver Spring, Md., assignor, by mesne assignments, to Remington Rand Inc., New York, N. Y., a corporation of Delaware Application March 31, 1949, Serial No. 84,563

4 Claims. (Cl. 340—345)

This invention relates to a method for recording displacement, and to apparatus therefor.

There has long existed a great need for an improved method and means for recording, as a function of time, the spatial displacement of various instrument and machine elements, especially small displacements of the order of, for example, a few thousandths of an inch. Prior art devices available for this purpose commonly include a transducer, which converts the displacement to be recorded into an appropriate electrical signal, which is then fed into a direct reading current or voltage recorder, employing a pen writing on paper or photography of a moving light spot. Such systems universally suffer from the disadvantages of excess bulk and weight, and afford poor response to oscillatory displacements of high frequency, due to the limits imposed by ink flow time and high inertia of the moving elements of the devices, as well as inherent limitations on the speed of movement of the recording medium. A further disadvantage of these systems is the usual necessity for providing electronic amplifying circuits between the transducer and the recorder, together with appropriate electrical power sources therefor. Numerous amplifier-less systems employ the action of a stylus on a soft recording medium. These systems suffer from the obvious disadvantage of lack of sensitivity, due to the reaction of the recording medium against the stylus, which tends to absorb power from the displacement being recorded.

It is an object of the present invention to provide a method and means for recording small scale displacements on magnetic storage media, employing mechanism of only a small fraction of the size and weight of devices heretofore employed for such purposes. A further object of the present invention is to provide a displacement recording system adaptable to reproduce either the quantitative time relationship of the recorded displacement, or the first time-derivative of such relationship. Another object is the provision of a recording system which may be utilized to derive displacement, acceleration or velocity.

A further object of this invention is to provide a displacement recording system for which the power requirement is limited to means for effecting appropriate motion of the recording medium relative to the recording element, whereby a time base is generated. For this purpose, a spring powered motor may often be employed, and no electrical power whatsoever is required for operation of the system. Still another object is the provision of a displacement recording system producing a record which may be read immediately, without any intervening photographic development or other intermediate process. In this connection, it is a further object to provide a system for simultaneously recording and telemetering displacement data.

Still another object of this invention is to provide a signal powered displacement recording system of very great sensitivity, in which the recording medium does not appreciably load the recording element. A further object is to provide a displacement recording system of controllable range and sensitivity. Other objects will be in part obvious and in part pointed out hereinafter.

The invention and the novel features thereof may best be made clear from the following description and the accompanying drawings, in which:

Figure 1 is a diagram of a simplified displacement recording system, employing a uniformly and unidirectionally pre-magnetized recording medium;

Figure 2 is a chart diagrammatically showing the recording process inherent in the system of Figure 1;

Figure 3 is a diagram of a displacement recording system corresponding generally to that of Figure 1, but employing a recording medium pre-magnetized with a varying carrier signal of constant amplitude and wave length;

Figure 4 is a chart diagrammatically showing the recording process inherent in the system of Figure 3;

Figure 5 is an elevational view of a recording accelerometer constructed in accordance with the present invention;

Figure 6 is an elevational view of a modified recording accelerometer, including means for telemetering recording data, and Figure 7 is a graph showing the variance of range and sensitivity of the present recording system with changes in magnetization strength of the recording magnet.

Referring to the drawings, in Figure 1 is shown a simplified arrangement for magnetically recording displacement, employing a permanent magnet 11, desirably in the form of a ring split by the gap 12, the ends of the ring abutting the gap constituting the poles of the magnet. In connection with the magnet is employed an elongated magnetic recording medium of conventional form, such as the tape 13 coated with the layer 14 of suitable magnetic recording material, for example finely divided magnetite and a binder. The layer 14 of magnetic recording material, it will be understood, may be similarly supported by a cylinder, or otherwise, or may be self-supporting, in the form of a wire or filament. Magnet 11 is disposed with the gap 12 thereof in spaced adjacency to the magnetic recording medium, as shown.

This arrangement is generally adapted for recording linear displacement of the magnet 11 relative to the magnetic recording medium in a direction substantially normal to the adjacent surface of the layer 14 of recording medium. For this purpose, the recording medium preferably is rigidly supported in a plane of reference, and the magnet is supported so as to be movable relative thereto. The magnet may be supported, for example, by a machine part whose displacement is to be recorded, by a frame member, by an instrument element or by any other movable member. In order to establish a time base of reference, it is necessary to effect relative transverse motion between the magnet and the recording medium, and this is accomplished preferably by the provision of suitable means (not shown) for moving the recording medium in the direction of its length, desirably, but not necessarily, at constant speed. As previously indicated, movement of the recording medium may be effected by a spring powered motor, by an electric motor when expedient, or otherwise.

In one embodiment of the invention, the recording medium is uniformly and uni-directionally pre-magnetized in the direction of its length. This may be accomplished readily by moving the recording medium in the direction of its length through a magnetic field of constant strength, disposed in the direction of the length of the medium. The magnetic field employed for the pre-magnetization may conveniently be that of a permanent magnet. In this embodiment of the invention the recording magnet, as shown, is disposed with its field substantially parallel to the length of the medium, but with the polarity of its field reversed relative thereto, whereby the field of the magnet is adapted to alter or erase the pre-magnetization of the recording medium. With the magnet oscillating symmetrically around a known and adjustable reference or zero position, and through a known amplitude, the zero position spacing between the gap thereof and the recording medium is adjusted to effect erasure of a predetermined proportion of the pre-magnetization of the recording medium by the field of the magnet, for example 25% or 50%. This is most conveniently done by causing the magnet to oscillate in a sine-wave fashion, and "reading" the resulting signal by means of a standard magnetic pickup connected to a cathode ray oscilloscope, by which means the output, or recorded signal, can be observed and adjusted accordingly. Thereupon movement of the recording medium in the direction of its length will result in erasure of the pre-magnetization of the medium to a degree uniform along its length, so long as the spacing between the magnet and the medium remains constant. Movement of the magnet toward or away from the medium, however, in accordance with the movement of a machine or instrument element, will vary the extent of partial erasure along the length of the medium, in a manner corresponding to the relative displacement of the magnet, thereby establishing a record of the displacement of the pertinent machine or instrument element. By utilizing a recording magnet of greater width than that of the recording medium, transverse movements of the magnet will not affect adversely the recording of displacements toward and away from the medium. It has been found that within useful ranges the extent of partial erasure of the pre-magnetization of the medium will vary directly with relative displacement of the magnet in a direction normal to the length of the medium, as will be more fully apparent in connection with the description of Figure 7.

The recording medium, after passage under the recording magnet, is therefore left in a state of magnetization varying along its length in accordance with displacements of the magnet relative to the medium. The resultant record may then be read by means of a standard magnetic recording reproducer, and the voltage output of the reproducer, being proportional to the rate of change of induction in the reproducing head, will correspond to the first time-derivative of the original recorded displacement. In order to recover a signal proportional to the original recorded displacement, the reproduced signal may be integrated against time. Electronic methods for accomplishing this integration are well known, and are not the subject of this invention.

In Figure 2, the operation of the above described process is sequentially illustrated. In this figure, diagram A represents the pre-magnetization of the recording medium along its length, or in relation to time of passage past a fixed point. Diagram B represents an exemplarly displacement of the recording magnet from zero position, in relation to time. Assuming partial erasure of the pre-magnetization of the medium in passage under the magnet displacement according to diagram B, the resultant magnetization of the medium in relation to time will be, it will be understood, as indicated in diagram C. When the record indicated in diagram C is played back or read, the voltage output of the reproducer will result in the signal shown in diagram D. As previously indicated, this signal may be integrated against time to derive a signal proportional to the magnitude of the recorded displacement. When the recorded displacement can be closely approximated by a series of sine functions, such as might occur in a recording of sound, utilization of the reproduced signal may not require integration, since the distortion involved in utilizing the first time-derivative will be confined primarily to phase shift.

In another embodiment of the invention, an initially non-magnetized recording medium is employed, the recording magnet being disposed in reference or zero position to impress a magnetic signal of predetermined intensity on the magnetic medium. In this case, motion of the recording magnet relative to the recording medium effects the printing of a magnetic signal of proportionately varying intensity in the recording medium, which signal may be read in the manner above described to obtain a reproduced signal proportional to the original recorded displacement, or to the first time-derivative thereof.

A further embodiment of the invention is shown in Figure 3, corresponding generally to that of Figure 1, the recording medium, however, being pre-magnetized with a varying carrier signal preferably of constant amplitude and wave length, and preferably of sine form. The carrier signal may be preliminarily impressed upon the medium by passage thereof at constant speed through a magnetic field varying in direction and strength with constant frequency and amplitude. Standard means well known in the art may be utilized to apply the varying carrier signal to the recording medium in this manner. An example of this is the passage of the recording medium past a reluctant gap in a ring electromagnet, the coil of which is connected into the output circuit of an oscillator.

Operation of this system in the manner described above will cause the pre-printed carrier signal to be erased from its original intensity to a series of new intensities in a manner, within specific ranges, proportionate to the displacement of the recording magnet relative to the medium. It will be recognized that the wave length of the carrier signal should be small compared to the wave length of the signal to be recorded. Similarly, the linear range of the recording magnet in erasing the carrier will be improved if the magnet gap is large compared to the carrier wave length. However, successful operation can be had when the gap is of the same order of magnitude as the carrier wave length. The resultant magnetic record, when reproduced by ordinary means, will then provide an output voltage which takes the form of an amplitude modulated signal of constant frequency, of which the envelope is directly proportional to the linear magnitude of the recorded displacement. This envelope may be observed directly by means of a cathode ray oscilloscope, or the signal may be rectified and filtered by conventional means to provide an output voltage directly proportional to the recorded displacement. In addition to providing a directly reproducible signal, the varying carrier signal system eliminates any distortion which might result from magnetic non-linearities occurring along the length of the recording medium, and therefore is the more useful system when it is desired to employ the recordings for quantitive measurement.

Operation of the varying carrier signal system is sequentially illustrated in Figure 4, wherein diagram E represents the pre-magnetization of the recording medium in relation to time of passage at constant speed past a fixed point, and diagram F an exemplary displacement of the recording magnet from zero position, in relation to time. Diagram G represents the modulated magnetization of the recording medium after recording the displacement of diagram F. Upon reading the record of diagram G, the voltage output of the reproducer results in the signal shown in diagram H, the envelope of which, it will be seen, is directly proportional to the recorded displacement. By rectifying and filtering the signal of diagram H, an output voltage proportional to the recorded displacement may be obtained, as indicated in diagram I. The wave forms shown in Figure 4 are based on spacing between the recording magnet and recording medium adapted to erase one-half the total carrier signal amplitude when the magnet is in its reference or zero position. It should be noted that the zero position of the recording magnet may be so adjusted as to allow full range positive, full range negative, or half positive and half negative range recordings, in all variations of the invention.

The system of this invention, particularly the form employing a recording medium pre-printed with a varying carrier signal, is ideally suited to recording large accelerations which occur within a relatively short period of time. If a mass-spring system is mounted on a framework which is subjected to acceleration in a direction including a degree of freedom of the system, the spring will be deflected due to reaction of the mass against the acceleration of the system. If the longest natural period of vibration of the mass-spring system is small compared to the duration of the acceleration pulse, the mass will be displaced relative to the framework through a distance proportionate to the magnitude of the acceleration. Recording of this displacement of the mass as a function of time, therefore, provides a record proportionate to the time function of the acceleration experienced by the framework. To measure accelerations of very short duration, it may be necessary to record for measurement extremely small deflections of the sensitive mass.

The invention may be utilized to record accelerations, particularly of the type above described, in the form illustrated in Figure 5. In this embodiment, the recording medium, exemplified by the layer 14 of magnetic recording material, is supported on the periphery of the accurately machined cylinder 15, rotatably supported in fixed axial position by the frame 16. The spring 17, fixed to and extending from frame 16, supports at or near its free end a permanent magnet 11 of appropriate mass, with gap 12 thereof in spaced adjacency to the layer 14. The recording medium may be non-magnetized or suitably pre-magnetized, conveniently before the cylinder is mounted in the frame, and the spacing between the magnet and the recording medium adjusted, as previously explained, to print a signal of desired intensity or to erase the desired percentage of the carrier signal when the magnet is in reference or zero position. Suitable means, not shown, are provided to rotate cylinder 15 about its axis at constant speed. For this purpose, a simple clockwork mechanism will suffice, and for recording accelerations of short duration one revolution of the cylinder or less will normally be adequate. To make recordings of greater length than the circumference of the cylinder, it is, of course, necessary to provide axial as well as rotative movement of the cylinder to prevent over-printing on already recorded areas.

Employing this arrangement, it will be readily seen that acceleration of the frame in the appropriate direction will effect a displacement of the magnet in a direction normal to the recording medium. As previously stated, this deflection will be proportional to the magnitude of the acceleration, when the natural period of the magnet-spring system is very small relative to the duration of the acceleration pulse. Displacement of the magnet during rotation of the cylinder, accordingly, will print a signal of varying intensity or will effect partial erasure or modulation of the carrier signal of the recording medium, in the manner previously described, whereby the displacement of the magnet, and thereby the acceleration experience of the frame, is recorded. The cylinder carrying the record may subsequently be removed from the instrument, and the record read by appropriate means.

The embodiment of the invention illustrated in Figure 5 may be adapted to record, instead of the acceleration of the frame, the velocity which it acquires during a short period of time, or the actual displacement it experiences. To adapt the above-described accelerometer to permit recording of velocity and displacement, it is necessary to replace the spring 17 by a very soft spring, or by a pendulum arm, pivotally connected to the frame. The pendulum arm may be vertically disposed, but need not be, provided that it is statically balanced, but dynamically unbalanced in the direction of motion to be recorded. The substitution of a pendulum arm or the equivalent soft spring will effect a relatively long natural period of the magnet-spring system, whereby small displacements of relatively short duration will result in displacements of the magnet relative to and proportional to the magnitude of displacement of the frame, due to the inertia of the magnet and its supporting structure. Employment of a recording medium non-magnetized or pre-magnetized with a uniform carrier signal in this type of recording system will then result in a recording producing a play back signal proportional to the velocity of the frame, that is, to the time rate of change of displacement of the magnet relative to the frame. If the recording medium is pre-magnetized with a varying carrier signal, the envelope of the resultant played back signal will directly represent the displacement experienced by the frame.

It will be obvious that the exemplary cylinder support described above is useful only for recordings of relatively short duration. To provide longer recording periods, recording tapes or wires may be provided, and handled in a manner essentially similar to that employed in common magnetic sound recorders. To attain highly precise measurements, it is necessary to employ recording media of exceptional uniformity and inherently low noise level. It is important, also, to support these media, at least under the recording magnet, in a manner which will not permit variance of position relative to the zero position of the magnet.

The system of the present invention is not limited in utility to the recording of displacement, acceleration and velocity. The system may be adapted, for example, to record ambient temperature as a function of time, by the simple expedient of replacing the spring of the modification of Figure 5 with a bi-metallic thermostatic element, in this manner effecting a displacement of the recording magnet proportional to the variations of temperature in the vicinity of the instrument. Temperatures at points remote from the instrument may be recorded by employing a repeater system similar to that commonly employed in numerous types of remote reading thermometers. That is, a mercury filled bulb located at the point where temperature is to be measured may be connected through a long capillary tube to a bellows, so coupled to the recording magnet as to cause its displacement relative to the recording medium in a manner proportional to variations of temperature at the bulb. By suitable employment of bellows systems, it is possible to construct pressure sensitive recorders employing the principle of the present invention. In such an embodiment, the recording magnet may be directly actuated by a bellows or diaphragm sensitive to pressure in the vicinity of the instrument, or which, similarly to the remote thermometer, may be actuated by pressure changes at a point remote from the recording instrument, but transmitted to it, as by a capillary tube or other means.

It is often desirable to record continuously small scale mechanical motions occurring in a device which is liable to destruction before self-contained recording instruments may be read. Recording of the acceleration experience of a guided missile is a typical example. The present invention is readily adaptable to a system for recording such information in the form of linear displacement, and simultaneously telemetering the recorded data. In this manner, a permanent record of the pertinent displacement is made, and a repeat of the record is simultaneously transmitted by radio waves, which repeat may be recorded at a distance, thereby insuring against complete loss of the record should the recording instrument be destroyed. An arrangement for continuously recording and telemetering displacement is shown in Figure 6, the displacement representing acceleration in this exemplary embodiment. In Figure 6 is shown a frame 16, the spring 17 extending therefrom, and the permanent magnet 11 of suitable mass supported by the outer end of the spring, an arrangement corresponding generally to that of Figure 5. Recording tape 13, suitably coated, is drawn from the supply reel 18, and passes over the guide plate 19 to the take-up reel 20, in the direction indicated. Guide plate 19 is so disposed relative to gap 12 of the magnet 11 as to effect the passage of the recording medium in spaced adjacency thereto, the spacing being adjusted, as previously explained, to print a signal of desired intensity or to erase a predetermined percentage of the pre-magnetization of the tape. The recording medium is preferably pre-magnetized with a varying carrier signal of constant amplitude and wave length, as previously described. The guide plate, it will be recognized, must be rigidly fixed with respect to the frame, and the supply reel and take-up reel also are desirably fixed with respect thereto. Upon passage of tape 13 from supply reel 18 to take-up reel 20, this arrangement effects continuous recordation of the acceleration of the frame in a direction normal to the upper surface of guide plate 19, by modulation of the pre-printed carrier signal by the field of the magnet 11. The record, in the form of the modulated carrier signal, may be read by a magnetic reading head 21 of conventional design, rigidly maintained with respect to guide plate 19 at a point adjacent the magnet 11, in reading relationship with the tape 13. The modulated signal picked up by reading head 21 is conducted to the amplifier 22, and thence to the transmitter 23 and antenna 24, whereby the record signal is transmitted and may be received and re-recorded at a distant point. The transmitted signal obviously will lag slightly behind the actual recording in point of time. This time lag may be reduced by disposing the reading head 21 as close to magnet 11 as is possible without interference therewith, and also, of course, by increasing the traverse speed of the tape 13.

The above described arrangement for simultaneously recording and telemetering displacement data possesses the basic advantage that the modulatable carrier signal is introduced as a pre-printed characteristic of the recording tape, and therefore need not be created at the point of recording by auxiliary apparatus. It is possible, therefore, by employing such an arrangement, to reduce the amount of apparatus required per channel of data telemetering from inaccessible locations. In situations where the frequency requirements inherent in the recorded information are not strict, it is possible to use a single transmitter and a single amplifier, together with several data channels, each operating at a different carrier frequency. This may be accomplished, for example, by employing a relatively wide tape on which the different channels are pre-printed side by side, and the different data signals may be introduced into these channels as amplitude modulations of the carrier signals. It would, of course, be necessary for the different carrier frequencies to be sufficiently diverse to permit separation at the receiving end, by means of appropriate filters, of the complex signal produced by adding all the data signals together for transmission by a single transmitter. The practice of introducing carrier signals as pre-printed characteristics of the recording medium will often allow a reduction of weight, occupied space, and power consumption in telemetering equipment, when compared with the now common practice of providing a distinct carrier oscillator for each data channel.

As previously indicated, the extent of recorded signal intensity or of erasure or modulation of the pre-magnetization or carrier signal of the recording medium by the recording permanent magnet has been found to vary directly with the relative displacement of the magnet, and to exhibit a substantially linear relationship thereto within useful ranges. This is illustrated graphically in Figure 7, wherein actual measurements made with a typical system are reproduced. In the graph the ordinate is graduated in percentage of carrier signal amplitude erasure, and the abscissa represents the spacing between the magnet and the recording medium, in units of thousandths of an inch.

The recording medium employed in the tests was preliminarily printed with a varying carrier signal of .003" wave length, and a recording speed of 6 inches per second was used, resulting in a carrier signal frequency of 2000 cycles per second. A typical set of values obtained are connected by curve Y, which, it will be seen, approximates (within 10%) a straight line for spacing values between 0.0 and 0.016", and within this range utilizes approximately 80% of the available carrier signal amplitude. Under the conditions of the curve Y tests, then, over a range of sixteen thousandths of an inch, the percentage of carrier signal erasure may be considered inversely proportional (with at least 90% accuracy) to the spacing between the magnet and the recording medium, and changes of percentage of erasure will be directly proportional to the magnitude of displacements of the magnet relative to the recording medium.

It has been found possible to control the slope and operative displacement range of the linear portion of the curve, percentage erasure v. spacing, by varying the state of magnetization of the permanent recording magnet. Curves X, Y and Z represent different series of tests run under identical conditions, with the exception that in series X the magnet was relatively weakly magnetized and in series Z the magnet was relatively strongly magnetized, while series Y was run at an intermediate value of magnet strength. Those portions of the curves which are sufficiently linear for use in measurement with an overall accuracy of at least 90% are shown in heavy lines. It will be seen that as the magnetization of the recording magnet is successively reduced, the slope of the linear portion of the curve first decreases slightly, then increases sharply, while the usable displacement range varies from approximately sixteen thousandths of an inch in curve Y to approximately five thousandths of an inch in curve X. In each curve approximately the same range of the available carrier signal amplitude is utilized. It will be understood, then, that by varying the state of magnetization of the recording magnet, the extent of useful displacement recording range of the recording magnet may be varied, as well as the sensitivity of the system. Curve X, for example, corresponds to a magnet strength resulting in a system most sensitive of those shown, but covering the smallest useful displacement range. Experience indicates that an essentially linear variation of percentage erasure v. spacing may be achieved with almost any desired slope.

In recording oscillatory magnet displacements of high frequency on a recording medium pre-magnetized with a varying carrier signal, it is necessary to maintain the frequency of the carrier signal large with respect to the frequency of the magnet oscillation, to maintain an approximately linear magnet displacement-percent erasure relationship, and avoid distortion of the recording. Since the magnetic characteristics of recording media impose definite practical lower limits upon the wave length of carrier signals which may be imposed thereon, the upper limit of recording magnet oscillation frequency which may be recorded by any given overall system may be raised only by increasing the traverse speed of the recording medium. It has been found, for example, that a 2000 cycle per second carrier signal may be impressed upon a magnetite recording tape traversing at six inches per second, corresponding to a carrier signal wave length of .003". A carrier signal frequency of 2000 cycles per second will be satisfactorily modulated by recording magnet oscillations of frequencies up to 500 cycles per second. If the magnet oscillation frequency is relatively increased above this one to four ratio, however, a tendency for distortion to take place during swings of the magnet away from the recording medium becomes evident. This effect is evidently due to spreading of the field of the magnet, a factor which becomes of greater importance as the magnet recedes from the recording medium. Distortion of this nature may be reduced by operating along a relatively steep percentage erasure v. spacing curve, so that the spacing between the magnet and the recording medium remains in a range wherein field spreading is relatively unimportant.

As various possible embodiments may be made of the mechanical features of the above invention, all without departing from the scope thereof, it is to be understood that all matter hereinbefore set forth or shown in the accompanying drawings is to be interpreted as illustrative and not in a limiting sense.

I claim:

1. Apparatus for recording acceleration forces and the like comprising, a base, means for mounting the base on a device subject to movements to be analyzed, magnet means for establishing a magnetic recording field, means for mounting the magnet means from the base, an elongated magnetizable recording member, means for mounting the recording member from the base so that a portion of the recording member may be moved in a path having a point thereof within the magnetic recording field, means for moving the recording member in said path, the combined mounting means for at least a part of the magnet means and the recording member comprising resilient means whereby said part of the magnet means is supported relative to the said point in the path of the recording member so that said part of the magnet means assumes a normal position with respect to said point in the absence of inertia forces acting on the apparatus, the magnet means being isolated from all movement generating influences other than inertia forces, the arrangement being such that under the influence of movements applied to the base said part of the magnet means will undergo displacement about its normal position relative to the said point in the path of the recording member to thereby alter the recording field to magnetize the recording member according to the relative displacement between said part of the magnet means and recording member adjacent the said point.

2. Apparatus as in claim 1 in which the natural vibratory period of the resiliently supported means is short as compared to the duration of improvement applied to the base.

3. Apparatus as in claim 1 in which the natural period of vibration of the resiliently supported means is long compared to the duration of movement applied to the base.

4. Apparatus as in claim 1 and further including a magnetic reading head supported on the base in a fixed position relative to the path of the recording member, whereby data recorded in the member by the magnet means is detected, the apparatus further including transmitting means connected to be actuated by the output of the reading head.

References Cited in the file of this patent

UNITED STATES PATENTS

| Number | Name | Date |
|---|---|---|
| 720,621 | Rosenbaum | Feb. 17, 1903 |
| 1,588,706 | Cothran | June 15, 1926 |
| 2,038,647 | Clausen | Apr. 28, 1936 |
| 2,229,293 | Huntley | Jan. 21, 1941 |
| 2,254,933 | Bryce | Sept. 2, 1941 |
| 2,370,134 | Begun | Feb. 27, 1945 |
| 2,419,195 | Begun | Apr. 22, 1947 |
| 2,487,793 | Esval | Nov. 15, 1949 |